(12) United States Patent
Stolz

(10) Patent No.: US 6,317,830 B1
(45) Date of Patent: *Nov. 13, 2001

(54) PROCESS AND DEVICE FOR AUTHENTICATING SUBSCRIBERS TO DIGITAL EXCHANGES

(75) Inventor: Helmut Stolz, Siegen (DE)

(73) Assignee: Deutsche Telekom AG, Bonn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,693
(22) PCT Filed: Jun. 8, 1996
(86) PCT No.: PCT/DE96/01061
  § 371 Date: Dec. 8, 1997
  § 102(e) Date: Dec. 8, 1997
(87) PCT Pub. No.: WO96/42181
  PCT Pub. Date: Dec. 27, 1996

(30) Foreign Application Priority Data

Jun. 13, 1995 (DE) ............................................. 195 21 484

(51) Int. Cl.$^7$ ................................ H04L 9/00; H04K 1/00
(52) U.S. Cl. .......................................... 713/168; 713/185
(58) Field of Search ................................ 380/25, 23, 49, 380/273; 379/93.02; 713/168, 169, 172, 173, 185, 201, 202

(56) References Cited

U.S. PATENT DOCUMENTS 5,036,461  7/1991  Elliott et al. .

5,253,295 * 10/1993  Saada et al. ........................... 380/23

(List continued on next page.)

FOREIGN PATENT DOCUMENTS 39 05 667   8/1980  (DE) .
39 19 734  12/1990  (DE) .

(List continued on next page.)

OTHER PUBLICATIONS

Diffie et al., "Secure CCM", Telesis, vol. 16 No. 2, pp. 42–50, Jan. 1, 1989.*
Diffie W Et Al: "Secure CCM", Telesis, vol. 16, No. 2, Jan. 1, 1989, pp. 42–50, XP000072004.

(List continued on next page.)

*Primary Examiner*—Gilberto Barron, Jr.
*Assistant Examiner*—Anthony DiLorenzo
(74) *Attorney, Agent, or Firm*—Kenyon & Kenyon

(57) ABSTRACT

A device for authenticating subscribers to one or more exchanges of a digital communication network having at least one subscriber-side network terminator, to which at least one data terminal may be connected. It is a distinction of the invention that provision is made at every subscriber for at least one first authentication module capable of receiving a first identification carrier, and provision is made in the exchange for at least one second authentication module capable of receiving a second identification carrier, or that, alternatively, connected between the network terminators assigned to the exchange and the exchange is an additional device, in which is arranged a second authentication module capable of receiving a second identification carrier, the authentication modules being capable of encoding and/or decoding a piece of information with an individual, subscriber-specific key and of exchanging information with each other for unilateral and/or bilateral authentication.

18 Claims, 3 Drawing Sheets

U.S. PATENT DOCUMENTS

| | | |
|---|---|---|
| 5,297,192 | 3/1994 | Gerszberg . |
| 5,307,411 | 4/1994 | Anvret et al. . |
| 5,347,580 * | 9/1994 | Molva et al. ............ 380/25 |
| 5,357,563 | 10/1994 | Hamilton et al. . |
| 5,488,649 * | 1/1996 | Schellinger ............ 379/62 |
| 5,544,245 * | 8/1996 | Tsubakiyama ............ 380/21 |

FOREIGN PATENT DOCUMENTS

| | | |
|---|---|---|
| 41 38 861 | 10/1992 | (DE) . |
| 41 20 398 | 1/1993 | (DE) . |
| 43 35 161 | 4/1995 | (DE) . |
| 43 39 460 | 4/1995 | (DE) . |
| 94 17 399 | 4/1995 | (DE) . |
| 44 06 602 | 9/1995 | (DE) . |
| 0 618 713 | 10/1994 | (EP) . |
| 2 619 941 | 3/1989 | (FR) . |

OTHER PUBLICATIONS

O'Higgins Et Al.: "Encryption and ISDN—A Natural Fit", International Switching Symposium 1987, Mar. 15–20, 1987, Phoenix, Arizona USA, pp. 863–869, XP002017713.

Advances in Cryptology, Santa Barbara, Aug. 16–20, 1987, No. Conf. 7, Jan. 1, 1987. Pomerance C. pp. 9–18, XP000130200 Presttun K: "Intergrating Cryptography in ISDN".

Gasser Et Al.: "The Digital Distributed System Architecture", Proc. 12th Nat. Computer Security Conf., Oct. 1989, pp. 305–319, XP002017714.

Ford W Et Al.: "Public–Key Cryptography and Open Systems Interconnection", IEEE Communications Magazine, vol. 30, No. 7, Jul. 1, 1992, pp. 30–35, XP000307910.

K. Presttun, "Sicherungsfunktionen in Nachrichtennetzen," Elektrisches Nachrichtenwesen, Band 60, Nummer 1, 1986, pp. 63–70.*.

H. Schulte, "Telekommunikation, Dienste und Netze wirtschaftlich planen, einsetzen und organisieren," Aktuallsierungs –und Ergänzungslleferung, Jun. 1995.*.

* cited by examiner

| 1 | 1 | 8 | 1 | 1 | 1 | 1 | 1 | 8 | 1 | 1 | 1 | 8 | 1 | 1 | 1 | 8 | 1 | 1 |
|---|---|---|---|---|---|---|---|---|---|---|---|---|---|---|---|---|---|---|
| F | L | $B_1$ | E | D | A | F | F | $B_2$ | E | D | S | $B_1$ | E | D | S | $B_2$ | E | D |

FIG. 5

PROCESS AND DEVICE FOR AUTHENTICATING SUBSCRIBERS TO DIGITAL EXCHANGES

FIELD OF THE INVENTION

The present invention concerns a process for authenticating subscribers to one or more exchanges of a digital communication network, in particular an ISDN network, as well as a device for authenticating subscribers.

RELATED TECHNOLOGY

Digital telecommunication networks are known that feature a plurality of subscriber connections and digital exchanges. Since a subscriber connection is linked to a digital exchange via unsecured lines, intruders or eavesdroppers can tap into the lines at different points. An intruder, once having gained access to the exchange system, can use the exchange at the expense of the subscriber, even without being authorized to do so.

In the article "SECURE CCM," published in TELESIS, vol. 16, No. 2, Jan. 1, 1989, pp. 42 through 50, XP000072004, Diffie et al. disclose, among other things, an authentication method, according to which the receiver of information can ascertain the authenticity of the sender's identity. However, the known method is based on the technically very complex and therefore also costly Rivest, Shamir & Adleman (RSA) algorithm. Also the article gives no indication on performing the verification of the sender's identity in a cost-effective manner in the sender's exchange.

In the article "ENCRYPTION AND ISDN—A NATURAL FIT," published in International Switching Symposium 1987, Mar. 15–20, 1987, Phoenix, Ariz., U.S. pp. 863 through 869, XP002017713, O'Higgins et al. describe a method for encoded transmission of a plain text produced by a sender to a receiver via an ISDN network. In order to exchange plain text between the two subscribers in a secure manner, O'Higgins et al. propose that either a security module be implemented in each data terminal installed at the subscriber or that a security module be implemented only in the network terminator to which the data terminals are connected.

In the article "INTEGRATING CRYPTOGRAPHY IN ISDN," published in Advances of Cryptology, Santa Barbara, Aug. 16–20, 1987, Conf. No. 7, Jan. 1, 1987, Pomerance C., pp. 9–18, XP000130200, K. Presttun describes an authentication procedure on the basis of public-key cryptography. This procedure uses a central authentication server, which contains the public keys of all users. Again, authentication takes place between the communicating subscribers themselves. One disadvantage of this known authentication procedure is that a central authentication server must be made available and also full connection must be established prior to the authentication procedure proper, which not only entails expenses, but is also technically complex.

Therefore, the object of the invention is to make misuse of the exchange by unauthorized intruders difficult or even impossible.

The present invention is implemented in a digital communication network, in particular an ISDN network. Such a digital communication network includes, as is known, a plurality of exchanges, at least one network termination installed at the subscriber, to which at least one data terminal, such as telephone sets, personal computers, or fax machines, can be connected. Undesired use of an exchange by an intruder is prevented by providing at least one first authentication module to each subscriber; said authentication module is capable of receiving an identification carrier; in addition, at least one second authentication module capable of receiving a second identification carrier is provided in the exchange, with both authentication modules being capable of encoding and/or decoding and exchanging information with each other, with a subscriber-specific cryptographic key for unilateral or bilateral authentication.

Connection-specific assemblies containing the second authentication module are installed at each exchange. This embodiment is, however, expensive and complex, since the exchanges must be rebuilt.

A more cost-effective method, which can be implemented in a simpler manner, consists of installing additional assemblies, based on the existing digital exchange, between the exchange and the respective network terminations. The respective second authentication module for each subscriber connection is installed in these additional assemblies.

The first authentication module of a given connection owner is advantageously arranged in the network termination corresponding to each subscriber connection. In this case a single authentication module is sufficient even if the owner has connected up to eight data terminals to the network termination via an $S_0$ bus. It is perfectly possible to equip each data terminal of a given network termination with its own authentication module and its own identification carrier. Another alternative may consist of connecting a security device containing the corresponding authentication module between each data terminal and its network termination. It can be easily seen, however, that both of the latter implementation options are complex and costly, since each data terminal requires both its own authentication module and a connection-specific identification carrier. The information to be exchanged between the two authentication modules to authenticate the subscriber connection contains the address of a certain subscriber connection, a command sequence, which may contain, for example, the request for the first authentication module to encode the incoming information, and a random number. If the digital communication network is an ISDN network, the exchange of information between the first authentication module and the second authentication module takes place via the D channel of the ISDN network. Each identification carrier can then store an individual cryptographic key that is specific to a given subscriber connection owner. The identification carrier may be a smart card that can be inserted by the owner of a subscriber connection in the first authentication module and by an employee of the network operator in the second authentication module. An advantageous alternative provides a software module as the identification carrier, which can be used interchangeably in the respective authentication module. In an advantageous refinement, the first authentication module can encode additional confidential connection establishment and/or service information and the second authentication module, assigned to the exchange, can decode the information thus encoded.

Since the establishment of a connection and/or service information requires a higher bit rate than authentication information, it is convenient that separate cryptographic modules be installed for the first and second authentication modules exclusively for encoding and decoding the connection establishment and/or service information.

BRIEF DESCRIPTION OF THE DRAWINGS

The present invention is explained below with reference to the embodiments illustrated in the following figures, in which:

FIG. 5 shows the frame format of the ISDN bit stream.

DETAILED DESCRIPTION

Figure 1:
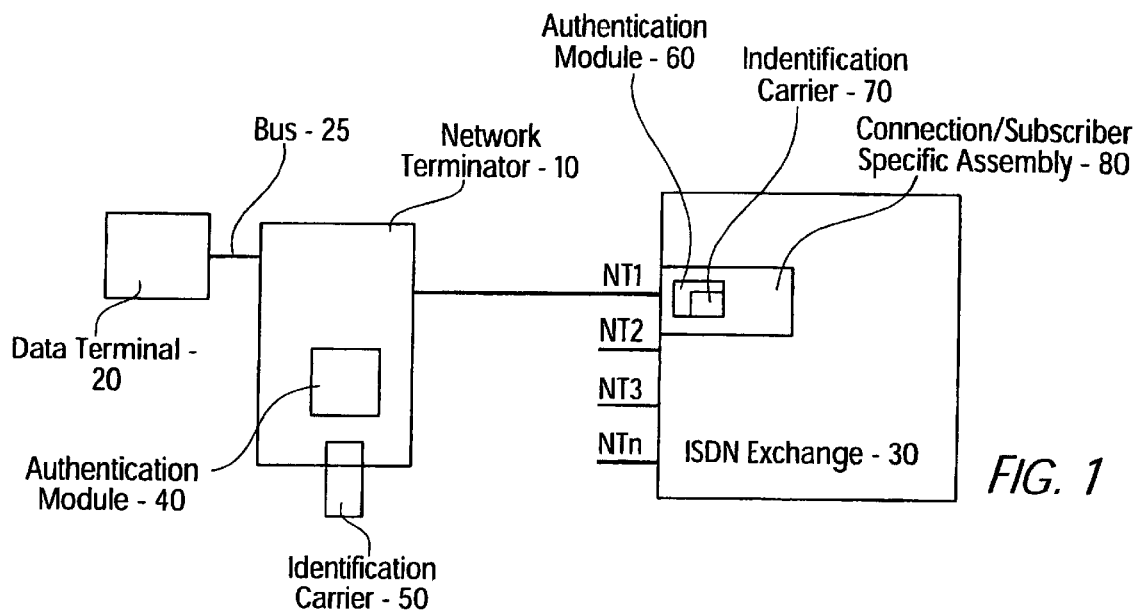
FIG. 1 schematically shows a section of a digital communication network with a line from a telephone set to a digital exchange where the present invention is implemented.

FIG. 1 shows in a simplified form a part of a digital communication network, exemplified in the description that follows as an ISDN network. A telephone set 20 is illustrated as a data terminal on the subscriber side, which is connected to a network termination 10 via an $S_0$ bus 25. Network termination 10, also referred to as Net Terminator (NT), can be installed in the building or room of a subscriber connection owner. Up to eight data terminals, such as other telephone sets 20, fax machines, or personal computers, can be connected to the $S_0$ bus 25. In the example illustrated, an authentication module 40 according to this invention is built into network terminator 10, where an identification carrier 50 can be inserted. Identification carrier 50 can be a smart card or a software module. Authentication module 40 and identification carrier 50 are designed so that they can encode or decode information to authenticate a given subscriber with a subscriber-specific or connection-specific key. This key can be stored in a storage module of the smart card of the connection owner. The output of network termination 10 is connected to a corresponding ISDN exchange 30 via a twisted two-wire cable in a known manner. Of course, an ISDN network includes a plurality of network terminators 10 and a plurality of exchange systems 30, which may be interconnected via twisted two-wire cables. In the future, conventional two-wire cables can be supplemented and replaced by fiber-optic cables, for example. Exchange 30 includes a plurality of assemblies 80 (FIG. 1 only illustrates a single connection-specific assembly 80), assigned to certain subscriber connection owners. According to the first embodiment according to this invention, an authentication module 60 is arranged in each connection-specific assembly 80, where a subscriber's smart card or a connection-specific software module 70 is inserted by an operator if needed. It is assumed that identification carrier 70 in exchange 30 also contains the individual cryptographic key of the connection owner for telephone set 20. The precise sequence for authenticating the subscriber of telephone set 20 to exchange 30 is explained in more detail below.

Figure 2:
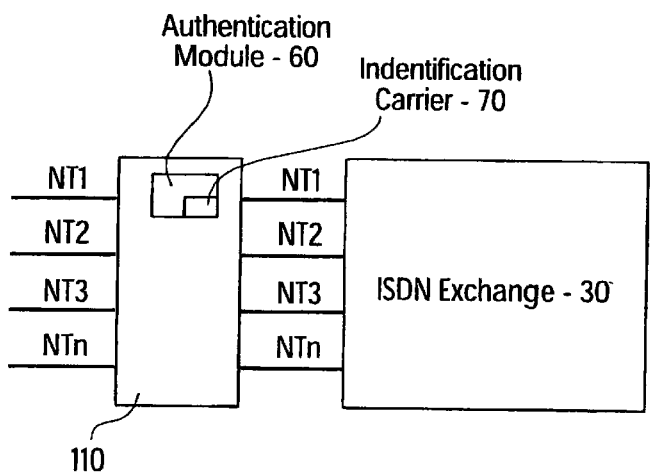
FIG. 2 shows a second embodiment where the authentication module according to the present invention is installed in an additional device on the exchange side.

FIG. 2 shows an alternative embodiment where additional device 110 is connected between network termination 10 and exchange 30. For greater clarity, FIG. 2 shows additional device 110 only with the built-in authentication module 60. Normally all authentication modules of subscribers or network terminators jointly served by exchange 30 are installed in additional device 110. The corresponding connecting lines are indicated in FIGS. 1 and 2. The corresponding lines NT1 to network terminator 10, line NT2 to a $2^{nd}$ subscriber or network terminator, line NT3 to a $3^{rd}$ subscriber or network terminator, and line Nth to an nth subscriber or network terminator. Again, identification carriers 70 can be inserted as smart cards from the outside by an operator or, in the implementation as a software module, can be introduced in the respective authentication module 60. Additional device 100 has the advantage that existing ISDN network exchanges can continue to be used without time-consuming, costly, and complex modifications of the exchange system to perform authentication, for example, of the subscriber of telephone set 20 to exchange 30.

Figure 3:
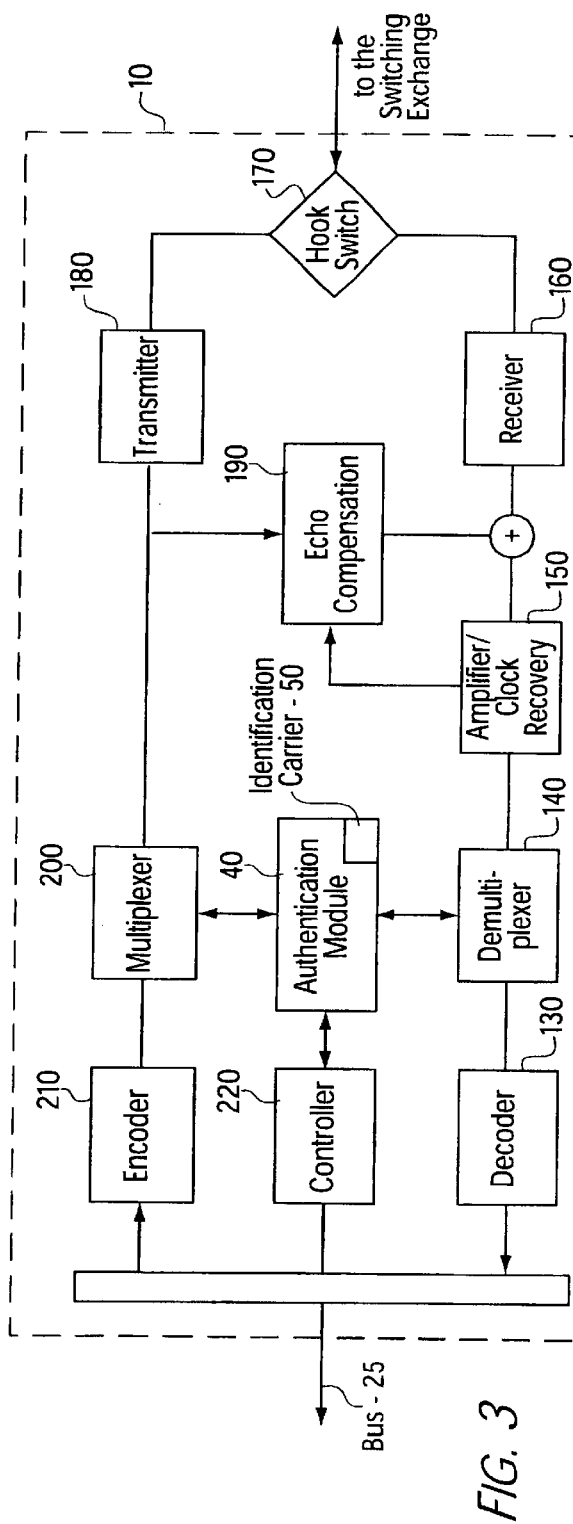
FIG. 3 shows a detailed block diagram of the network termination with the authentication module according to the present invention.

FIG. 3 shows a simplified block diagram of the known network terminator 10, where the authentication module 40 according to this invention, together with identification carrier 50, are installed. On the subscriber side, network terminator 10 has a connection unit for $S_0$ bus 25, to which up to eight data terminals 20 can be connected. Since the structure and the mode of operation of network terminator 10 are generally known, only the essential assemblies are briefly explained below. Basically network terminator 10 has a send path and a receive path. The send path includes an encoder 210, which modulates the outgoing data stream according to known encoding procedures, a multiplexer 200, which combines the two B channels and the D channel into a continuous data stream in a time multiplexing operation. A suitable frame format consists of 48 bits per 250 ms, with only four D channel bits provided per frame. In other words, 16 kbits/sec are transmitted over the D channel. As explained below, a subscriber is authenticated to exchange 30 via this D channel. The send path then goes to a hook switch 170 via a transmitter 180; said hook switch sends the outgoing data stream to a two-wire cable connecting exchange 30 with network terminator 10. Incoming data streams go through hook switch 170, a receiver 160, and a device 150, which equalizes and amplifies the data stream received and recovers the clock signal from it. Then the data stream passes through a demultiplexer 140, which decomposes the data stream again to the two B channels and the D channel. The demultiplexed data stream passes through decoder 130 and is then transmitted, according to a destination address, to telephone set 20, for example, via the $S_0$ bus 25. An echo compensation 190, connected in parallel between transmitter 180 and receiver 160, is used, among other things, for compensating outgoing messages sent to the receive path through hook switch 170 and receiver 160. The heart of network terminator 10 is a controller 220, which controls the management and mutual control of the individual assemblies. The authentication module 40 according to this invention with the inserted identification carrier 50 is connected, for example, to controller 220, encoder 210, multiplexer 200, demultiplexer 140, and decoder 130. Controller 220 is also responsible for activating or deactivating the authentication device, i.e., authentication module 40 and identification carrier 50 as required by the situation.

Figure 4:
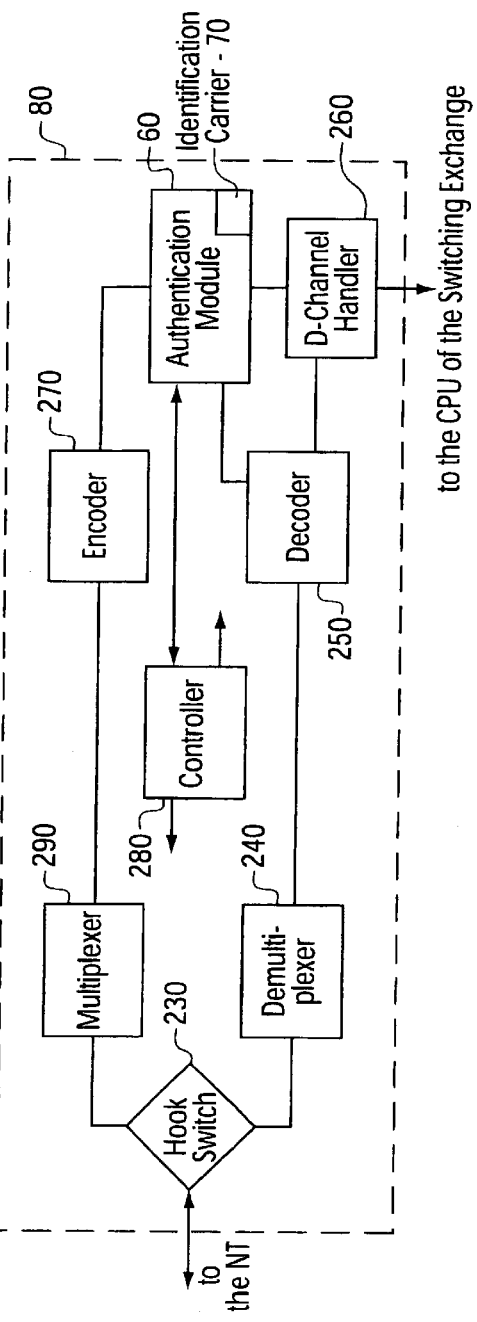
FIG. 4 shows a detailed block diagram of a connection-specific assembly in the exchange with a built-in authentication module.

FIG. 4 shows an example of a block diagram of a subscriber-specific assembly 80, installed in exchange 30. The connection-specific assembly 80 basically forms the counterpart of network terminator 10. Incoming data messages go, via the two-wire line, to a hook switch 230 and then pass through a demultiplexer 240, a decoder 250, and a D channel handler 260. D channel handler 260 supplies control information to a central controller of exchange 30. In the opposite direction, outgoing messages pass through an encoder 270, a multiplexer 290, and a hook switch 230 on the two-wire line to network terminator 10. Also in connection-specific assembly 80, a controller 280 is responsible for the management of and interaction between the individual assemblies. Authentication module 60 is installed in a connection-specific assembly 80, according to this invention, with a smart card that can be inserted from the outside, or a software module 70 that can be introduced. Authentication device 60, 70, which includes authentication module 60 and identification carrier 70, is connected to encoder 270, decoder 250, D channel handler 260, and controller 280. As mentioned previously, authentication device 60, 70 can also be installed in supplemental device 110, as shown in FIG. 2.

It is, in fact, convenient to install authentication device 40, 50 (authentication module 40 and identification carrier 50) in network terminator 10 itself, since in this way only one authentication device 40, 50 is required, regardless of the number of data terminals 20 connected. However, it is also conceivable to arrange the subscriber-side authentication device 40, 50 in each data terminal 20. Another alternative consists of providing a security device (not illustrated) between network terminator 10 and each connected data terminal 20; authentication device 40, 50 is then implemented in said security device. The latter two options, however, entail a considerable disadvantage in that for each data terminal 20 that a subscriber wishes to connect to the respective network terminator 10, he must purchase a separate authentication device 40, 50. For economic reasons, it is convenient to install authentication devices 40, 50 shown in FIG. 1, in network terminator 10 itself. Then identification carrier 50 can be installed in the form of a software module by the network operator when network terminator 10 is installed at the subscriber. If identification carrier 50 is a smart card, the subscriber can purchase this card, containing the subscriber's individual subscriber key, e.g., from the network operator.

The authentication of the subscriber of telephone set 20 to exchange 30 is now described in detail.

It is assumed that one subscriber-side authentication device 40, 50 is installed in network terminator 10 and a second authentication device 60, 70 is installed in assembly 80, assigned to that subscriber in exchange 30. According to the embodiment illustrated in FIG. 2, authentication device 60, 70 can also be installed in supplementary device 110. The procedures described below occur basically in the same way in both cases.

Let us assume a case where the subscriber lifts the earpiece of his telephone set 20 to announce his wish to establish a connection. Telephone set 20 sends a connection establishment message to exchange 30 via network terminator 10. Responding to the connection establishment message, exchange 30 sends a connection establishment confirmation message back to network terminator 10. In addition, authentication information is transmitted from exchange 30 to network terminator 10. This authentication information may contain address data of the subscriber and of telephone set 20, command data and information data. Command data include, for example, for authentication device 40, 50 in network terminator 10, the request "send back received information encoded." The information used for authentication may be an at least 8-byte long random number, for example, including any amount of filler information. Controller 220 reads the authentication information received, in particular the command data, and causes authentication device 40, 50, to encode the information transmitted with the address and command data with a subscriber- or connection-specific key and send it back to identification carrier 70 of exchange 30 via multiplexer 200, transmitter 81, hook switch 170, and the two-wire line. As mentioned earlier, the information used for authentication is transmitted in the D channel, filtered out from the data received with the help of demultiplexer 140 and sent to identification carrier 50. The encoded information arrives at authentication module 60 in the subscriber-specific assembly 80 of exchange 30. Controller 280 activates authentication device 60, 70 to decode the encoded information with the subscriber-specific key, which corresponds to the key on identification carrier 50 of network terminator 10. Controller 280 or authentication device 60, 70 checks the encoded information with the information sent previously. If the two pieces of information agree, D channel handler 260 is activated via controller 280 and sends a control message to the central unit of exchange 30 to inform it that the subscriber wishing to establish a connection is authorized to do so. Then exchange 30 causes the subscriber's network terminator 10 to transmit connection establishment and service information.

An advantageous refinement provides for the connection establishment and service information to be also transmitted in an encoded form to exchange 30, for example, in the D channel. The subscriber's connection establishment and service information is encoded either by the authentication device 40, 50 itself or by an additional security device consisting of a security module and an identification carrier (not illustrated). Authentication device 60, 70 or a separate security device consisting of a security module and a subscriber-specific identification carrier in the exchange or in the additional device is responsible for decoding the encoded connection establishment and/or service information. Thanks to the combination of these two procedures, the danger of unauthorized intruders being able to tap into the connecting line between network terminator 10 and exchange 30 and eavesdrop on subscriber-confidential messages in order to use the exchange at the subscriber's expense in an unauthorized manner is considerably reduced if not completely eliminated.

Another authentication process has the subscriber authenticated to exchange 30 prior to the start of connection establishment. The subscriber picks up the earpiece of his telephone set 20, whereupon network terminator 10 transmits a connection establishment message to exchange 30. Instead of sending back a connection establishment confirmation message, exchange 30 or supplementary device 110 causes an unencoded message, consisting of the target address of a certain subscriber connection, a command sequence, and the information to be encoded, to be transmitted. In response to the command sequence, controller 220 in network terminator 10 activates authentication device 40, 50, which then encodes the information transmitted in the D channel with the subscriber-specific cryptographic key and, as described above, sends it back to authentication module 60 in exchange 30. Controller 280 of exchange 30 activates authentication device 60, 70, to decode the encoded information with the subscriber-specific key known to said authentication device. If the unencoded transmitted information agrees with the decoded information, the central unit of exchange 30 obtains, via D channel handler 260, the information that the subscriber wishing to establish a connection is authorized to do so, and causes the exchange to send a connection establishment confirmation message to network terminator 10. The subscriber is now authenticated to the exchange and can transmit the connection establishment and service information to the exchange.

According to another process, authentication device 60, 70 on connection-specific assembly 80 of exchange 30 sends, in predefined, settable intervals, information, including an address and a command sequence, to network terminator 10. Controller 220 of network terminator 10 interprets the command sequence. After interpretation, the controller activates authentication device 40, 50 to supplement, encode with the individual subscriber-specific key, and send back, to authentication module 60 in exchange 30, if necessary, the information incoming via the D channel. Controller 280 in subscriber-specific assembly 80 now activates authentication module 60 to decode the encoded information received with the subscriber-specific key that is known to said authentication module. If authentication device 60, 70 or controller 280 determines that the pieces of information to be compared do not coincide and thus the identity check is negative, it sends a message to the central unit of exchange 30, via the D channel handler 260, not to initiate any connection establishment. The above-described procedure can also be used to check the authorization of a subscriber during ongoing communication. If an unauthorized intruder has tapped onto the line between network terminator 10 and exchange 30, authentication device 60, 70 will determine, after the predefined, settable interval, at the latest, that an intruder has tapped onto the connection. Exchange 30 then causes the connection to be terminated.

What is claimed is:

1. A system for authenticating a subscriber to an exchange of a digital communication network, the digital communication network including a subscriber-side network terminator for connecting a data terminal, the system comprising:
    an authentication module arranged at the subscriber for receiving a first identification carrier containing a subscriber-specific cryptographic key, the authentication module including:
        means for encoding information by using the subscriber-specific cryptographic key to provide encoded information, and
        means for transmitting the encoded information; and
    another authentication module, arranged at one of the exchange and a location upstream from the exchange, for receiving another identification carrier containing the subscriber-specific cryptographic key, including:
        means for decoding the encoded information by using the subscriber-specific cryptographic key to authenticate the subscriber to the exchange.

2. The system as recited in claim 1, further comprising:
    means for establishing a connection between the network terminator and the exchange after the functions of encoding, transmitting encoded information, and decoding have been performed; and
    means for causing the exchange to request at least one of establishment information and service information if the subscriber has been authenticated.

3. A method for authenticating subscribers to at least one exchange of a digital communication network, the digital communication network including at least one subscriber-side network terminator for connecting at least one data terminal, at least one authentication module arranged at a subscriber for receiving a first identification carrier containing a subscriber-specific cryptographic key, and at least one second authentication module arranged at one of the exchange and a location immediately upstream from the exchange for receiving a second identification carrier containing the subscriber-specific cryptographic key, the method comprising the steps of:
    transmitting information from the second authentication module to the first authentication module,
    encoding the information received with the subscriber-specific cryptographic key in the first authentication module, and transmitting the encoded information back to the second authentication module, and
    decoding the encoded information in the second authentication module with the subscriber-specific cryptographic key to authenticate the subscriber to the exchange.

4. The method as recited in claim 3 further comprising the step of establishing a connection between the network terminator and the exchange after the steps of transmitting information, encoding, and decoding, and upon successful authentication of the subscriber, causing the exchange to request at least one of establishment and service information.

5. The method as recited in claim 3 further comprising the step of establishing a connection between the network terminator and the exchange, and upon establishing the connection the exchange performs the transmitting of information step, the transmitting of information step including transmitting a connection establishment confirmation signal and information to the data terminal, and then the steps of encoding and decoding are performed.

6. The method as recited in claim 3 further comprising the step establishing a connection between the network terminator and the exchange after authenticating the subscriber and thereafter periodically checking the authenticity of the subscriber.

7. The method as recited in claim 3 further comprising the steps of:
    transmitting information from the first authentication module to the second authentication module,
    encoding the information received in the second authentication module with the help of the subscriber-specific cryptographic key and transmission of the coded information back to the first authentication module,
    decoding the information in the first authentication module with the help of the subscriber-specific cryptographic key for authentication of the exchange to the subscriber.

8. The method as recited in claim 3 wherein the information used to authenticate the subscriber is transmitted over a D channel of an ISDN network.

9. A device for authentication of subscribers to at least one exchange of a digital communication network with at least one subscriber-side network terminator for connecting at least one data terminal, the device comprising:
    at least one first authentication module for receiving a first identification carrier, the first authentication module arranged at each subscriber; and
    at least one second authentication module for receiving a second identification carrier being arranged one of at and immediately upstream from the exchange, with the first and second authentication modules capable of at least one of encoding and decoding with a subscriber-specific key and of exchanging information for at least one of unilateral and bilateral authentication.

10. The device as recited in claim 9 further comprising an additional device arranged between the network terminator and the exchange, the second authentication module being arranged in said additional device.

11. The device as recited in claim 9 further comprising the at least one data terminal, the at least one data terminal being connected to the network terminator and wherein the first authentication module is arranged in each of the at least one data terminal.

12. The device as recited in claim 9 further comprising the at least one data terminal and a security device, the security device containing at least the first authentication module and being located between the network terminator and each of the at least one data terminal.

13. The device as recited in claim 9 wherein the first authentication module is arranged in the network terminator.

14. The device as recited in claim 9 wherein the information to be exchanged contains the address of a subscriber connection, a command sequence, and a random number.

15. The device as recited in claim 9 wherein the digital communication network is an ISDN network and the information used for authentication to be exchanged is exchanged via a D channel of the ISDN network.

16. The device as recited in claim 9 wherein the first identification carrier and second identification carrier are one of smart cards and software modules.

17. The device as recited in claim 9 wherein the first authentication module is capable of encoding at least one of confidential connection establishment and confidential service information, and the second authentication module is capable of decoding at least one of the encoded connection establishment and the encoded service information.

18. The device as recited in claim 9 further comprising a security module for receiving an identification carrier and of at least one of encoding and decoding at least one of connection establishment and service information, the security module capable of being installed separately for each first and second authentication module.

* * * * *